US012169251B2

(12) United States Patent
Pulley

(10) Patent No.: US 12,169,251 B2
(45) Date of Patent: Dec. 17, 2024

(54) INDIRECT RADAR DETECTION

(71) Applicant: XMOS LTD, Bristol (GB)

(72) Inventor: Douglas Roger Pulley, Bath (GB)

(73) Assignee: XMOS LTD, Bristol (GB)

( * ) Notice: Subject to any disclaimer, the term of this patent is extended or adjusted under 35 U.S.C. 154(b) by 338 days.

(21) Appl. No.: 17/597,095

(22) PCT Filed: May 13, 2020

(86) PCT No.: PCT/EP2020/063372
§ 371 (c)(1),
(2) Date: Dec. 27, 2021

(87) PCT Pub. No.: WO2020/259916
PCT Pub. Date: Dec. 30, 2020

(65) Prior Publication Data
US 2022/0244352 A1  Aug. 4, 2022

(30) Foreign Application Priority Data

Jun. 28, 2019 (GB) ..................................... 1909303

(51) Int. Cl.
G01S 7/41 (2006.01)
(52) U.S. Cl.
CPC .............. *G01S 7/414* (2013.01); *G01S 7/412* (2013.01)
(58) Field of Classification Search
None
See application file for complete search history.

(56) References Cited

U.S. PATENT DOCUMENTS 5,990,822 A * 11/1999 Honigsbaum ......... G01S 13/003
342/16
6,535,159 B1 3/2003 Nishiguchi et al.
(Continued)

FOREIGN PATENT DOCUMENTS

WO 2006/059926 A1 6/2006

OTHER PUBLICATIONS

"Who We Are: Ourbrands, " by the Wi-Fi Alliance; Austin, Texas, USA; posted on the Internet at wi-fi.org; copyright in the year 2024. (Year: 2024).*

(Continued)

*Primary Examiner* — Bernarr E Gregory
(74) *Attorney, Agent, or Firm* — Sughrue Mion, PLLC

(57) ABSTRACT

A method, apparatus, and system for detecting presence of an object of low radar cross section RCS (250) in an environment (200) are provided. Radar detection at one or more radar frequencies greater than 2 GHz is used to determine a steady state response profile (300) of the environment (200). The steady state response profile (300) comprises at least one indication of one or more reflected signals (202) from an object of high RCS in the environment (200). Radar detection at the one or more radar frequencies is then used to determine a test response profile (600) of the environment (200). The test response profile (600) is compared with the steady state response profile (300) to determine a presence of a, object of low RCS (250) in the environment by identifying at least partial absence of at least one of the reflected signals (202) in the test response profile (600).

19 Claims, 9 Drawing Sheets

(56) References Cited

U.S. PATENT DOCUMENTS

| | | | |
|---|---|---|---|
| 7,952,511 B1* | 5/2011 | Geer | G01S 13/04 |
| | | | 342/13 |
| 2005/0073411 A1 | 4/2005 | Butler | |
| 2006/0045354 A1* | 3/2006 | Hanna | G08B 13/19613 |
| | | | 382/224 |
| 2012/0280847 A1 | 11/2012 | Frucht | |
| 2017/0097413 A1 | 4/2017 | Gillian et al. | |
| 2018/0329050 A1 | 11/2018 | Amihood et al. | |

OTHER PUBLICATIONS

United Kingdom Search Report for GB1909303.8 dated Nov. 21, 2019.
International Search Report for PCT/EP2020/063372 dated Aug. 18, 2020 [PCT/ISA/210].
Written Opinion for PCT/EP2020/063372 dated Aug. 18, 2020 [PCT/ISA/237].

* cited by examiner

INDIRECT RADAR DETECTION

CROSS REFERENCE TO RELATED APPLICATIONS

This application is a National Stage of International Application No. PCT/EP2020/063372 filed May 13, 2020, claiming priority based on United Kingdom Patent Application No. 1909303.8 filed Jun. 28, 2019.

TECHNICAL FIELD

The present disclosure relates to a method, apparatus and system for detecting presence and optionally estimating dimension, position and/or velocity of an object of low reflectivity within an environment.

BACKGROUND

The term "radar" refers to any of various systems for detecting objects. Known radar systems are designed to detect and measure parameters of a "target" by transmitting known Radio Frequency (RF) waveforms, and then receiving and processing the signals reflected back from the target. The ability to detect and process the target depends on the received signal-to-noise ratio of its reflections and the ability to discriminate between the signals reflected from the wanted "target" object and signals reflected from other unwanted objects or "clutter". The radar system may also suffer from noise from, for example, thermal noise at the receiver.

In a radar system, a transmit antenna or array of transmit antennas outputs a known RF signal and a receive antenna detects returned signals reflected from objects within the environment. The strength of a returned signal reflected off an object depends on the radar cross section (RCS) of that object. This applies to both objects which are targets and objects which are clutter. The RCS is a joint measure of the reflectivity and the effective size or "surface area" of the object, and is essentially the composite of one or more scattering centres. These can be viewed as point sources on the reflecting surface of the object and, given suitable receive antenna array geometries, and round trip delay measurement resolution, the position of these can be estimated in 3D space by comparison of received phase and the estimate of range to the scattering centre via its transmission delay (Joseph B. Keller. Geometrical theory of diffraction. Journal of the Optical Society of America, 52(2):116-130, February 1962).

SUMMARY

According to a first aspect disclosed herein, there is provided a method of detecting presence of an object of low radar cross section RCS in an environment, the method comprising: A) using radar detection at one or more radar frequencies greater than or equal to 2 G to determine a steady state response profile of the environment, the steady state response profile comprising at least one indication of one or more reflected signals from a reflective object in the environment; B) storing the steady state response profile to a memory; C) using radar detection at the one or more radar frequencies to determine a test response profile of the environment; D) comparing the test response profile with the steady state response profile to determine a presence of an object of low RCS in the environment by identifying at least partial absence of at least one of the reflected signals in the test response profile.

The object of low RCS may comprise one or more humans or one or more animals.

In an example, the steady state response profile is determined as an average of a plurality of response profiles of the environment determined at different times.

In an example, steady state response profile is determined during one or more time periods during which the environment is less likely to contain an object of low RCS than outside the one or more time periods.

The steady state response profile may additionally or alternatively be determined as an average of a plurality of response profile of the environment determined at different times, wherein each of the different times falls within a time period during which the environment is less likely to contain an object of low RCS.

In an example, is an office and the one or more predetermined time periods comprise non-working hours of the office.

In an example, the one or more predetermined time periods comprise non-daylight hours, i.e. night time.

In an example, the steady state response profile is determined in response to user input. The user input may be provided, for example, from a personal computing device of a user such as a smartphone.

In an example, the steady state response profile is determined at least partially during an initial calibration step.

In an example, the comparing step comprises determining a difference between the test response profile and the steady state response profile, wherein presence of the object of low RCS is determined in response to the difference being greater than a threshold value. The difference may be, for example, a mean square difference.

In various examples, the one or more radar frequencies may be at least 2 G, at least 3 G, at least 4 G, at least 5 G, at least 6 G, at least 7 G, at least 8 G, at least 9 G, or at least 10 G, etc. Even higher frequency radar may be used, such as mmWave radar having a frequency of 30 G or more.

In an example, the environment is an indoor environment.

In an example, the method comprises estimating a horizontal size of the object of low RCS based on a duration of the at least partial absence of the at least one of the reflected signals and an expected velocity of the object of low RCS.

In an example, the method comprises estimating a velocity of the object of low RCS based on a duration of the at least partial absence of the at least one of the reflected signals and an expected horizontal size of the object of low RCS.

In an example, the method comprises repeating steps C and D to determine two at least partial absences of different respective reflected signals; and estimating a velocity of the object of low RCS based on a time difference between when the two at least partial absences occurred.

In an example, the method comprises repeating steps C and D to determine multiple instances of presence of an object of low RCS object in the environment, wherein the determined presence of an object of low RCS is associated with a confidence value, the confidence value being based on the determined number of instances of presence.

The location of each reflective object within the environment may be known and therefore each reflected signal may be associated with the respective known location of the reflective object from which the reflection is received.

In an example, the method comprises estimating at least one location of the or each reflective object and storing a respective at least one location of the reflective object(s) in association with the indication of the reflected signal from the reflective object.

In an example, the reflection is associated with a known location within the environment, and the method comprises estimating a location of the object of low RCS based on the known location associated with the reflection which is identified to be at least partially absent in the test response profile.

In an example, the method comprises estimating a height of the object of low RCS based on the location associated with the reflected signal which is determined to be at least partially absent from the test response profile.

In an example, the method comprises controlling an electronic device based on the determined presence of the object of low RCS.

The electronic device may be a consumer appliance. Examples of consumer appliances include: a television, a set-top box, a radio, a hi-fi, a smart speaker, a desktop or laptop computer, a tablet, a smartphone, a washing machine, a cooker, a microwave, a dishwasher, or a refrigerator.

The radar detection may be performed using radar apparatus integrated into said electronic device.

In an example, the method comprises controlling the electronic device to enter a high-power mode in response to determining presence of the object of low RCS.

According to a second aspect disclosed herein, there is provided an apparatus for detecting presence of an object of low RCS in an environment; the radar device comprising: a radar front end for implementing radar detection at a radar frequency of 2 GHz or greater to determine radar response profiles of the environment; a memory storing a steady state response profile of the environment, the steady state response profile comprising an indication of one or more reflected signals caused by reflection of an emitted radio frequency signal from a reflective object in the environment; a processor configured to: use the radar front end to determine a test response profile; and compare the test response profile with the steady response profile stored in the memory to identify at least partial absence of at least one of the reflected signals in the test response profile indicative of an object of low RCS being present in the environment; and in response to determining presence of the object of low RCS in the environment, generate an output indicating presence of the object of low RCS in the environment.

In an example, the apparatus is integrated into a consumer appliance.

In an example, the radar front end is a frequency-modulated continuous-wave, FMCW, radar front end for implementing FMCW radar detection.

According to a third aspect described herein, there is provided a system comprising the apparatus according to the second aspect installed in the environment.

In an example, the system comprises at least one reflector disposed within the environment, the reflector having a high radar cross section.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
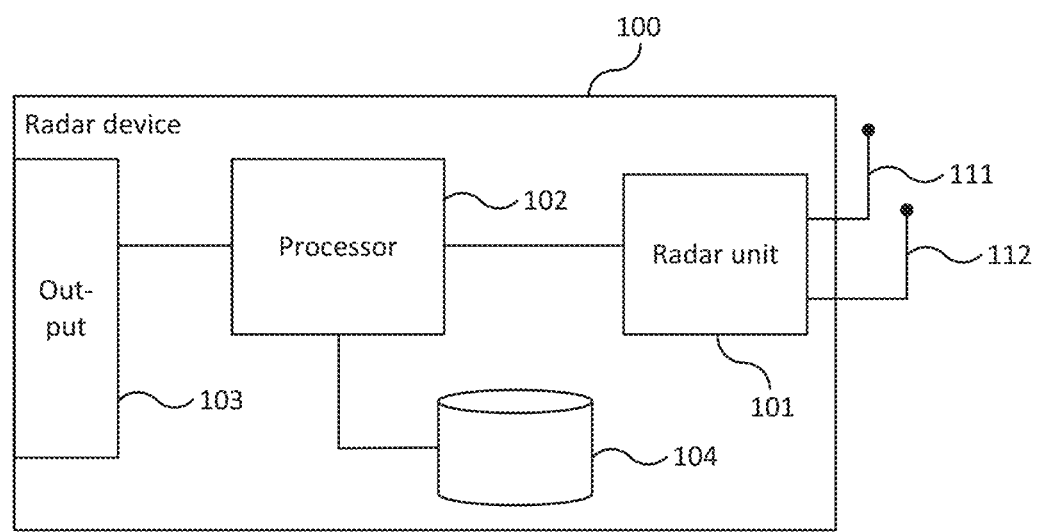
FIG. 1 shows schematically a radar device in accordance with examples described herein.

The present disclosure provides methods, devices and systems for using radar in the detection of one or more objects which have low-radar cross section (RCS) at the radar frequency being used. The RCS of an object depends on its size and reflectivity. Therefore, an object may have a low RCS by having either a small size, low reflectivity, or both.

In accordance with examples described herein, detection of an objection with low RCS is achieved by determining a "steady state response profile" of the environment and storing it to memory. The steady state response is the "background" radar response of the environment, e.g. when there are no occupants in the environment. The steady state response profile comprises responses indicative of reflected RF signals from high-RCS objects located in the environment. Examples of high-RCS objects include walls, white boards, television screens, etc.

At a later point in time, another reading of the environment, a "test response profile" is determined and compared to the steady state response profile. If a response is not present in the test response profile which was present in the steady state response profile (an expected response has disappeared or at least partially reduced in strength), this is taken as an indication of a low-RCS object now being present within the environment which is blocking that reflection from being received, i.e. at least partially obscuring a known static high RCS clutter object. This is more robust than attempting to detect potentially very weak target reflections from the low-RCS object, especially as range from the radar antennas increases, In other words, the steady state response profile is a steady state "picture" of the clutter in the environment which can be suppressed when searching for wanted responses. Hence, it is possible to identify the appearance of a low-RCS object within the environment which was not previously present. Such a low-RCS object may be called a "target" low-RCS object in order to distinguish it from other, "background", low-RCS objects within the environment which are always present. These background low-RCS objects do actually affect the steady state response, but in a consistent or predictable manner. Examples of such background low-RCS objects include soft furnishing, etc. In general, a target low-RCS object is mobile and therefore may or may not be present within the environment at any given time, whereas a background low-RCS object is stationary and is consistently present within the environment. Note however that this may not always be the case. In some examples, the steady state profile comprises predictable dynamics of the response profile of the environment. In such cases, presence of one or more low-RCS objects can still be determined by identifying a departure from the expected steady state dynamics. This is described in more detail later below.

It is appreciated that the terms "high-RCS" and "low-RCS" are relative terms. In reality, most objects will at least partially absorb and at least partially reflect radio-frequency signals. Therefore, the term "high-RCS" is understood to mean that the high-RCS object is large or otherwise reflective enough at the radar frequency being used that it causes a detectable reflection signal to be received. Similarly, the term "low-RCS" is understood to mean that the low-RCS object is sufficiently small or otherwise non-reflective (absorbing) at the radar frequency being used that it inhibits detection of a reflected signal. That is, the low-RCS object absorbs radar signals sufficiently to block or at least partially block a radar signal from otherwise being detected. Here "at least partially block" means that the signal is blocked sufficiently to cause a measurable drop in the received intensity of that signal.

The application of this method is valid throughout the RF spectrum, with higher accuracies being achievable at higher frequencies. In any case, the steady state response profile and the test response profile are captured at the same frequency. For example, at 2 G the signals may diffract around objects causing a more complicated response profile, but it is still possible to determine at least one reflected signal that was present in the steady state response profile but is absent, or at least partially absent, from the test response profile. At higher frequencies, such as approaching or around 10 GHz, the signals may behave and propagate in a more simply manner, being typically too weak to detect after a second reflection (i.e. these signals are expected to reflect once at most before attenuating beyond the detection limit). This means that the most likely mode of propagation of a signal within an environment is transmission-reflection-reception. Because of this, identifying a specific reflected signal as absent can allow for more in-depth information such as range information, velocity information, etc., to be inferred. It is understood that this is a matter of degree and that the values given herein are merely exemplary. In specific embodiments, the radar frequency may be at least 2 G, at least 3 G, at least 4 G, at least 5 G, at least 6 G, at least 7 G, at least 8 G, at least 9 G, at least 10 G, etc. Even higher frequency radar may be used, such as mmWave radar having a frequency of 30 G or more.

One particular application of the techniques described herein is the use of a high-frequency radar system comprised in an electronic device. These types of radar system may be low-cost or low-power, depending on the application. Examples of devices into which radar systems may be integrated include user devices such as, e.g. smartphones, laptops, etc., and consumer electronics devices such as televisions, set top boxes, etc. Radar systems such as these typically operate at very high frequencies (e.g. mmWave). This makes them useful in determining the surroundings of the electronic device, such as identifying inanimate objects in the vicinity of the electronic device. However, the high-frequency radio waves emitted by these radar system are largely absorbed by living beings, e.g. humans, animals, etc. This means that using such a radar system to detect any target object which is small and/or non-reflective at high-frequency (such as a human or animal) is challenging due to the low RCS of a target object and the presence of clutter with significant RCS, e.g. walls, doors, other large flat surfaces and large metal objects (e.g. kitchen appliances). The techniques described herein allow, for example, a high frequency system to be used to determine presence of a human other living being, or other object with a low RCS.

FIG. 1 shows schematically an apparatus in accordance with examples described herein. A radar device 100 comprises a radar unit 101, a processor 102, an output 103, and a memory 104. Also shown are a transmit antenna 111 and a receive antenna 112. The processor 102 is operatively coupled to each of the radar unit 101, output 103, and memory 104.

The memory 104 is a storage device for storing data. For example, the memory 104 may comprise one or more volatile or non-volatile computer storage devices. The memory 104 is accessible by the processor 102. The processor 102 may thereby write data to the memory 104 and read data from the memory 104, as required.

The output 103 shown in FIG. 1 is a functional block representing hardware for transmitting the results of the presence detection performed by the processor 102. The output 103 may, in some examples, connect to a network such as the Internet. The output 103 may be, for example, a wired or wireless interface. An example of a wired interface include Ethernet connection. Examples of wireless interfaces include a WiFi interface, a Bluetooth interface, etc. In any case, the output 103 may allow the radar device 100 to connect to one or more external electronic device, as described in more detail below.

The radar unit 101 is operatively coupled to each of the transmit antenna 111 and the receive antenna 112. The radar unit 101, along with the transmit antenna 111 and receive antenna 112 are constructed and arranged in accordance with any known high-frequency radar system and may collectively be referred to as the radar front end. That is, the radar unit 101 is constructed and arranged to control the transmit antenna 111 to output one or more RF signals into an environment and to receive RF signals via the receive antenna 112. The RF signals used by the radar front end are high frequency RF signals. In this context, the RF signals have a frequency of at least 2 GHz. As mentioned above, in examples the RF signals may have a higher frequency.

It is appreciated that the transmit antenna 111 and receive antenna 112 are shown in FIG. 1 for the purposes of illustrating the radio wave output and receive functionality, respectively. In practice, any suitable known radar technology hardware may be used. For example, an antenna array may be used in place of the single transmit antenna 111 shown in FIG. 1. Similarly, the transmit antenna 111 and receive antenna 112 are shown as separate integers in FIG. 1 for the sake of clarity, but it is understood that a single combined transmit-receive antenna may perform the functionality of both the transmit antenna 111 and receive antenna 112 described herein. In some examples, the transmit antenna 111 and receive antenna 112 may be part of the radar unit 101. For example, the transmit antenna 111 and receive antenna 112 (or combined transmit-receive antenna) may be integrated into a radar unit of a consumer device or consumer appliance.

Figure 13:
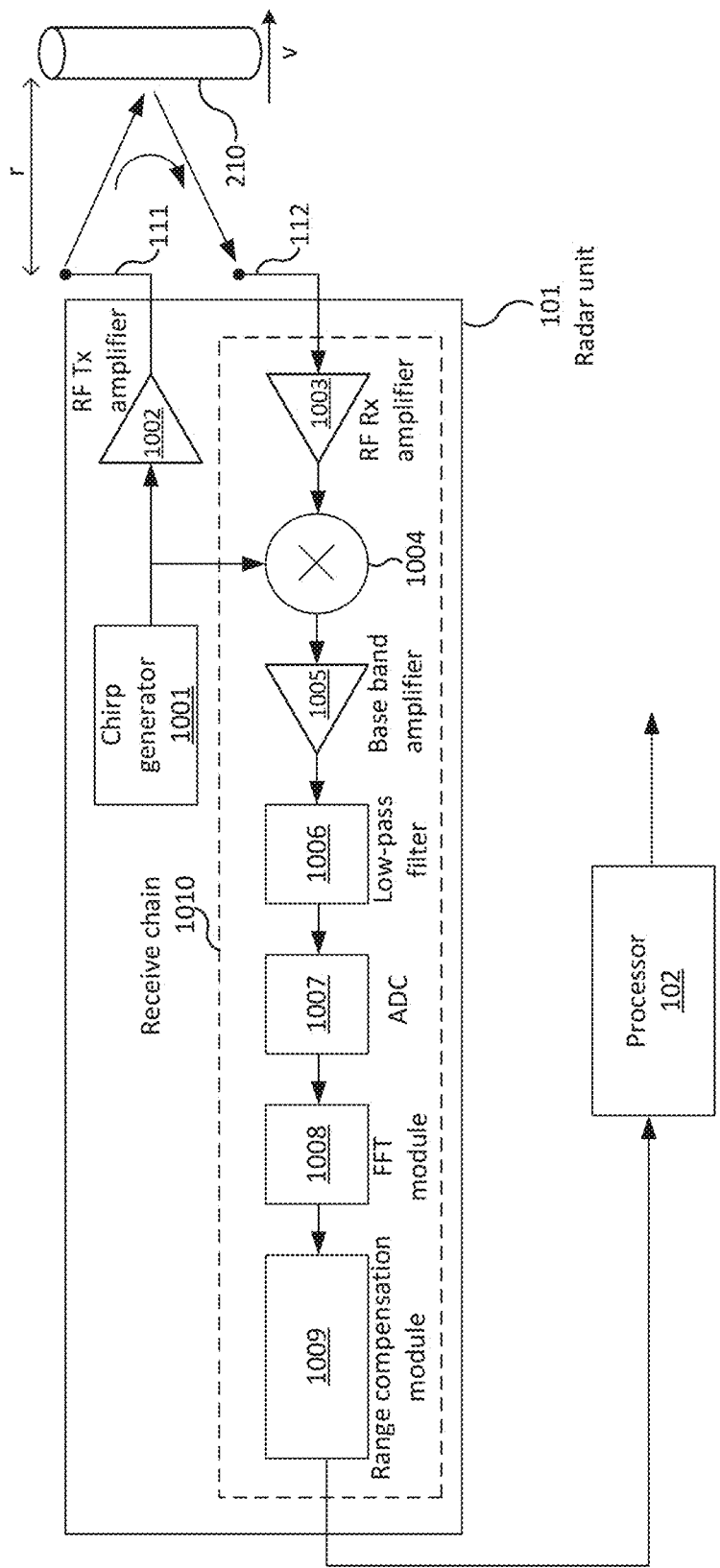
FIG. 13 shows an example of a configuration in which the radar front end implements Frequency-Modulated Continuous-Wave radar.

The radar unit 101 is configured to perform any preliminary processing steps on the received RF signals as required, depending on the particular configuration of the radar front end, to determine a radar response profile of the environment from signals emitted by the transmit antenna(s) 111 and received by the receive antenna(s) 112. A specific example of a configuration in which the radar front end implements Frequency-Modulated Continuous-Wave (FMCW) radar is illustrated in FIG. 13, described below.

In any case, the processor 102 is configured to receive radar data comprising a detected response profile of the environment from the radar unit 101 (i.e. from the radar front end) for the purposes of presence detection, as described herein.

The response profile of the environment depends on various factors such as the geometry of the environment, any objects located within the environment, and their RCS values. The appearance of one or more solid objects (including living beings such as humans or animals) can therefore result in apparent loss of signal from the clutter.

At higher frequencies in particular, almost all such solid objects strongly absorb radar signals. Further, at such higher frequencies, attenuation on reflection is significant so reception from a single reflection since transmission is the norm—two (or more) reflections are only occasionally seen. Therefore if clutter energy is seen to disappear from a long term known position it is assumed a low-RCS object is in line of sight from radar to the clutter and concealing the clutter reflection.

The environment 200 may be an indoor environment having walls, doors, furniture, etc. In any case, the environment 200 is expected to include at least some objects that act as significant reflectors. Their sites relative to the radar are 'uncontrolled' and their use in the systems described is opportunistic. To counter this, the environment 200 may in some examples be marked out with deliberately placed reflectors for the purposes of generating strong reflected signal responses. A reflector is an object which is purposely highly-reflective to radar signals at least at the transmit frequency of the transmit antenna 111. For example, a reflector may be a metal disc designed to create a predetermined pattern of high RCS clutter. One or more reflectors may be placed throughout the environment 200. The advantage of this is that the decrease in a response caused by a low-RCS object can be much easier to detect. One or more of the reflectors may give rise to multiple uniquely separable scattering centres.

The effect on the response profile caused by presence of a low-RCS object is now described with reference to FIGS. 2 to 5.

Figure 2:
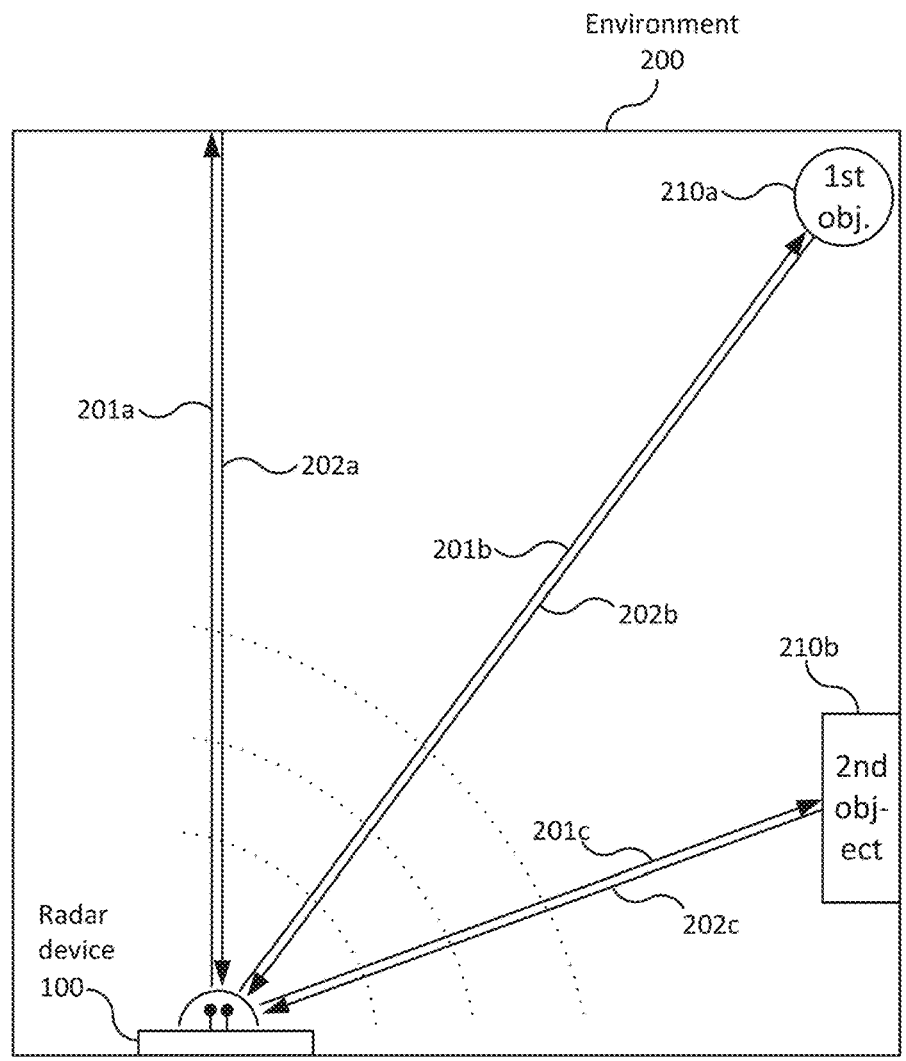
FIG. 2 shows schematically a top view of an environment in a first configuration.

FIG. 2 shows schematically a top view of an environment 200 in a first configuration.

Figure 3:
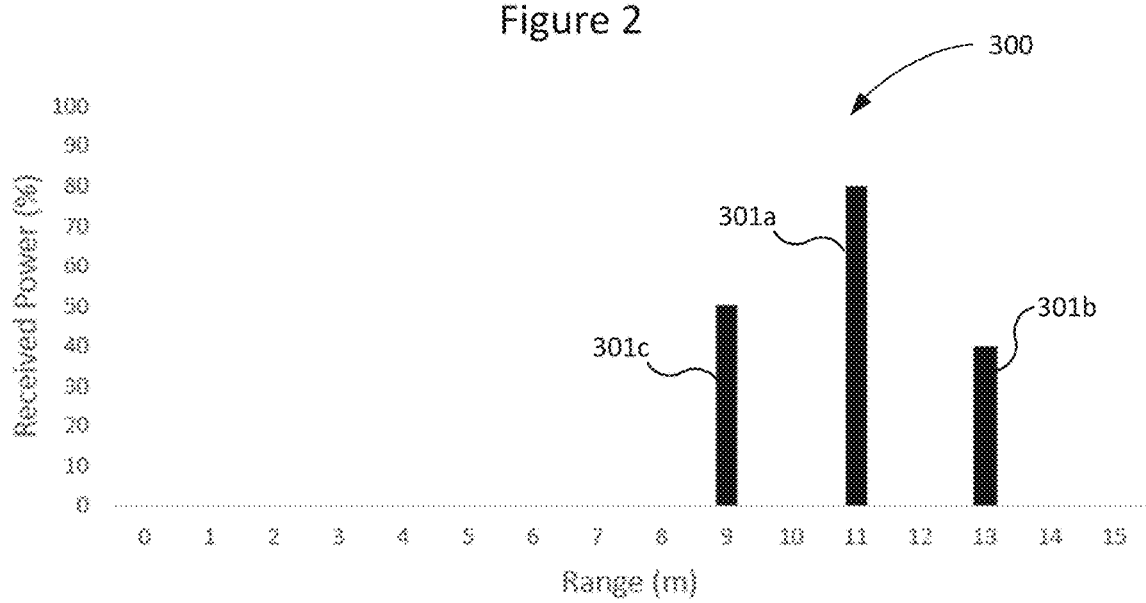
FIG. 3 illustrates the response profile of the environment in the configuration shown in FIG. 2.

FIG. 3 illustrates the response profile 300 of the environment 200 in the configuration shown in FIG. 2.

In this example, the environment 200 is a room bounded by four walls. The environment 200 may be, for example, a kitchen, living room, office space, etc. The radar device 100 is located within the environment 200. In this example, the radar device 100 is located on a wall of the environment towards one of the corners.

A first reflective object 210a and a second reflective object 210b are shown located within the environment 200. The reflective objects 210 are reflective in the sense that they substantially reflect radio waves at the transmit frequency or frequencies of the transmit antenna 111. It is appreciated that the reflective objects 210 are provided by way of example only and that there may be more or fewer reflective objects 210 within the environment 200. In particular, it is appreciated that that the reflective objects 210 are provided as examples of sources of reflection of high-frequency radio waves. That is, the reflective objects 210 have a high RCS at the radar frequency being used. As mentioned above, a high RCS can be achieved by the geometry of the object (the size), the inherent reflectivity of the object, or both. The sources of reflections within the environment 200 may not be as distinguishable as shown in FIG. 2. For example, the walls of the environment 200 itself will likely be another source of reflections, as illustrated in the figures and described below. One or more of the reflective objects 210 may comprise multiple uniquely separable scattering centres.

The radar device 100 is arranged to emit RF signals into the environment 200 via transmit antenna 111. The emitted RF signals may be reflected off objects located within the environment 200. The reflected signals are detected by the receive antenna 112 of the radar device 100.

In these examples, the RF signals are shown to take a simple linear path through the environment 200. Such a path is, as mentioned above, more typical of RF signals at higher frequencies (e.g. at or around 10 GHz). However, it is appreciated that the techniques described herein apply also to frequencies down to 2 GHz.

FIG. 2 illustrates three possible paths for RF signals. There are described below as a first, second, and third emitted signal 201, though it is appreciated that they are merely representative of different paths or "rays" of the same radar pulse.

A first emitted signal 201a travels to the opposite wall of the environment 200 from the radar device 100. The first emitted signal 201a is reflected off the wall. The resulting first reflected signal 202a travels back towards the radar device 100 and is received by the receive antenna 112.

A second emitted signal 201b travels to the first reflective object 210a. The second emitted signal 201b is reflected off the first reflective object 210a. The resulting second reflected signal 202b travels back towards the radar device 100 and is received by the receive antenna 112.

A third emitted signal 201c travels to the second reflective object 210b. The third emitted signal 201c is reflected off the second reflective object 210a. The resulting third reflected signal 202c travels back towards the radar device 100 and is received by the receive antenna 112.

Note that the scenario illustrated in the figures is simplified for the sake of explanation. In reality, the emitted signals 201 may not reflect directly off a surface in the environment 200 and return directly to the radar device 100. That is, the emitted signals 201 may reflect more than once (off more than one surface) before being detected by the receive antenna 112 of the radar device 100. It is therefore understood that the reflected signals 202, as referred to herein, are the signals as finally received by the receive antenna 112 and that this may be distinct from the signal as initially reflected off a surface (before undergoing at least one further reflection).

The signals received by the receive antenna 112 are processed by the radar unit 101 in accordance with the particular configuration of the radar front end. In a simple example, this involves determining at least an estimated range of each object 210 (distance from the radar device 100) based on the round-trip time of the signals, as known in the art. Any radar system that outputs an indication of energy received versus range can be used. The resulting response profile 300 of the environment 200 is an indication of the ranges of the reflective objects 210 in the environment 200. The response profile 300 comprises a response associated with each reflected signal received by the receive antenna 112.

Depending on the specific implementation of the radar front end, the radar front end and its preliminary processing procedures employed by the radar unit 101 may produce a sampled output which is the received energy at each range increment (the range resolution). The radar front end has a maximum range limit and also a finite range resolution and therefore captures received power data at a plurality of range samples or "bins". The response profile 300 therefore comprises an indication of the amount of power received (e.g. as a fraction of the transmit power) at each of the range samples. An example of a specific implementation of the radar front end is illustrated in FIG. 13.

As can be seen in FIG. 3, the response profile 300 comprises three responses: a first response 301*a* associated with the first reflected signal 202*a*; a second response 301*b* associated with the second reflected signal 202*b*; and a third response 301*c* associated with the third reflected signal 202*b*.

The first response 301*a* indicates that a reflective object (the wall, in this case) is present in the environment 200 at around eleven metres from the radar device 100. The second response 301*b* indicates that a reflective object (the first reflective object 210*a*, in this case) is present in the environment 200 at around thirteen metres from the radar device 100. The third response 301*c* indicates that a reflective object (the second reflective object 210*b*, in this case) is present in the environment 200 at around nine metres from the radar device 100. It is appreciated that the response profile 300 of the environment 200 may in reality be more complicated than shown in FIG. 3.

Figure 4:
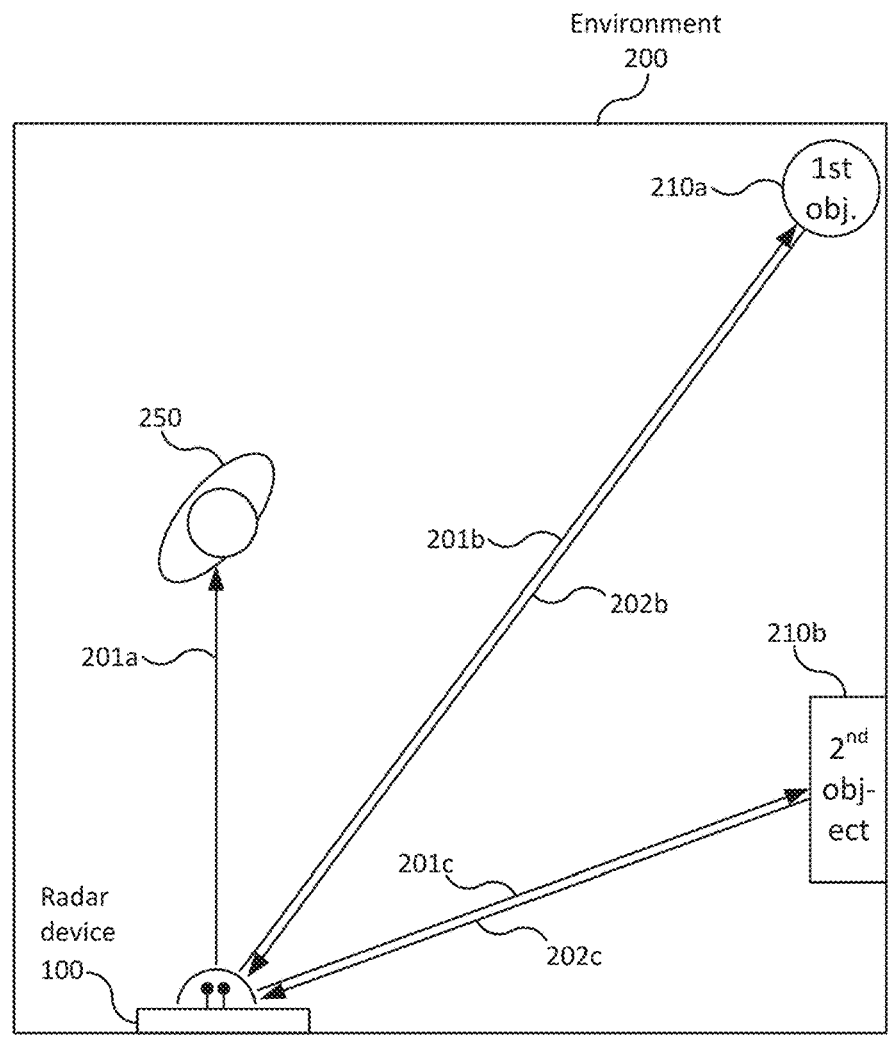
FIG. 4 shows schematically a top view of the environment in a second configuration.

FIG. 4 shows schematically a top view of the environment 200 in a second configuration. In this configuration, a low-RCS object 250 is present within the environment 200 and causes a change in the response profile of the environment 200, as described below. In this example, the low-RCS object 250 is a human, though it is appreciated that the human 250 is only an example of a low-RCS object and that other objects may cause similar changes to the response profile of the environment 200.

Figure 5:
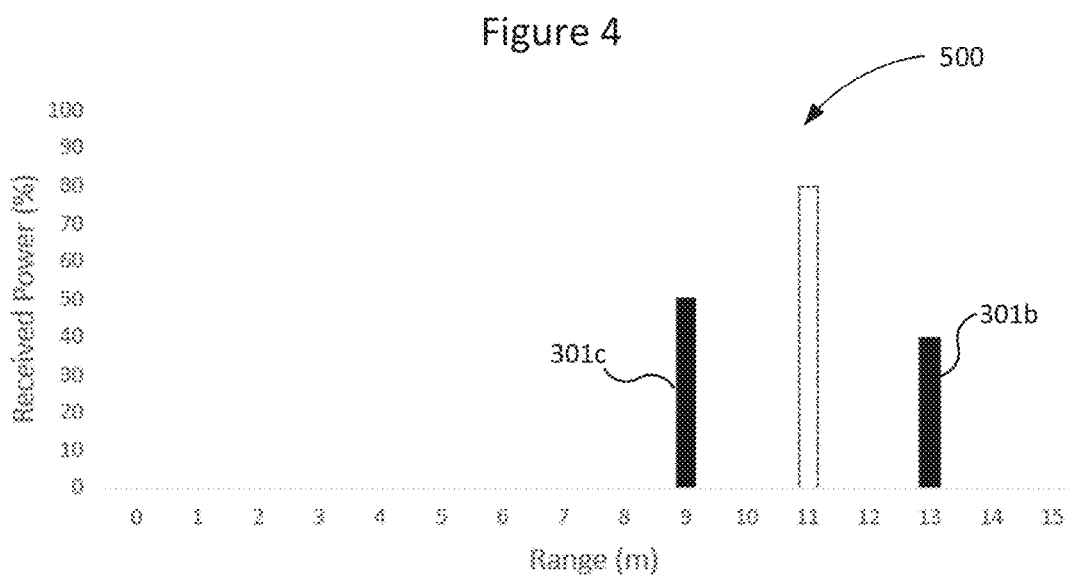
FIG. 5 illustrates a response profile of the environment in the second configuration shown in FIG. 4.

FIG. 5 illustrates a response profile 500 of the environment 200 in the second configuration shown in FIG. 4.

In this configuration, the second emitted signal 201*b* reflects off the first reflective object 210*a* as before. The resulting reflected signal 202*b* is received by the receive antenna 112 and causes the corresponding response 301*b* in the manner described above. This response can be seen in the response profile 500.

Similarly, the third emitted signal 201*c* reflects off the second reflective object 210*b* as before. The resulting reflected signal 202*c* is received by the receive antenna 112 and causes the corresponding response 301*c* in the response profile 500.

However, the configuration of the environment 200 shown in FIG. 4 comprises a human 250. The human 250 is positioned within the environment 200 along the path of the first emitted signal 201*a*. As mentioned above, the human 250 is an example of a low-RCS object which substantially absorbs the first emitted signal 201*a*. In other words, the human 250 blocks the first emitted signal 201*a*. Hence, the first emitted signal 201*a* does not reflect off the wall of the environment 200, as previously described with reference to FIGS. 2 and 3. The corresponding response (which was shown in FIG. 3 as response 301*a*) does therefore not appear in the response profile 500 shown in FIG. 5.

In other words, the absence of response 301*a* is indicative of presence of the human 250 (or another low-RCS object) in the environment 200. The processor 102 is configured to use this to generate an output indicative of presence of a low-RCS object within the environment 200.

To do so, the processor 102 performs two processes:

1) First, the processor 102 determines a "steady state" response profile of the environment 200. The response profile 300 shown in FIG. 3 is an example of a steady state response profile. The steady state response profile 300 is the "normal" response of the environment 200 which represents one or more expected reflections which are ordinarily observed in the environment 200.

2) Next, the processor 102 measures a "test" or "current" response profile of the environment. The response profile 500 shown in FIG. 5 is an example of a test response profile. The processor 102 is configured to compare the test response profile 500 to the steady state response profile 300 to identify any changes which are indicative of a low-RCS object 250 having entered the environment 200. Thereby, the processor 102 is able to determine a presence of a low-RCS object 250 within the environment 200.

The steady state response profile may be determined at one or more specific times when it is known or more likely to be the case that the environment 200 is currently in a true steady state. Alternatively or additionally, the steady state response profile may be determined by taking a long-term average of many response profile readings of the environment 200. These options, and the combination of the two, are now described with reference to FIGS. 6 and 7.

Figure 6:
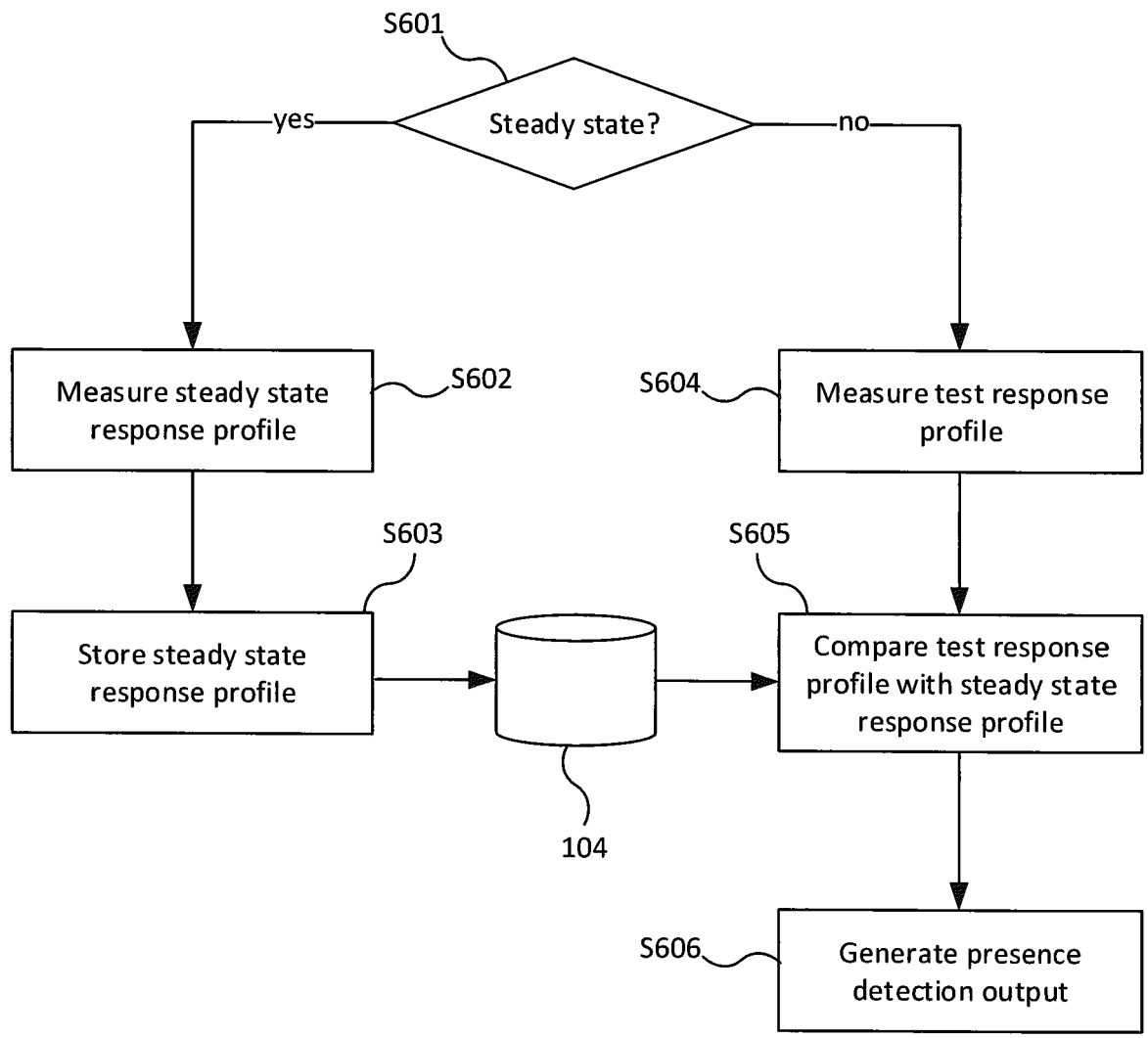
FIG. 6 is a flow diagram illustrating an example method performed by a processor of the radar device.

FIG. 6 is a flow diagram illustrating an example method performed by the processor 102. In this example, the steady state response profile is determined during one or more time periods during which the environment 200 is less likely to contain a low-RCS object 250 than outside the one or more time periods.

At S601, the processor 102 determines whether or not the environment 200 is currently in a "steady state". In practice, this means that the environment 200 does not, or is not likely to, currently contain any target low-RCS objects 250 such as a human, animal, etc. Note that there may be other "background" low-RCS objects (such as a water cooler) present within the environment 200.

The processor 102 may determine whether the environment 200 is currently in a steady state based on the current time. For example, the processor 102 may determine that the environment 200 is currently in a steady state during non-daylight hours (e.g. night time). In a specific example, if the environment 200 is an office space, then the processor 102 may assume a steady state outside of working hours. During working hours, i.e. when humans are likely to be in the office, the processor 102 may assume that the current state of the environment 200 is not a steady state.

The processor 102 may be configured to operate according to two different modes: a calibration mode; and a normal operation mode. In the calibration mode, the processor 102 assumes that all measured response profiles of the environment 200 are of the environment 200 in its steady state. In the normal operation mode, the processor 102 assumes that all measured response profiles are test response profiles, i.e. not steady state response profiles.

In some examples, the processor 102 may switch between the two modes in response to user input. The processor 102 may enter the calibration mode in response to receiving user input. The user input may be provided to the processor 102 using, e.g. a smartphone. This allows, for example, a commissioning user to ensure that the environment 200 is currently in a steady state (e.g. there are no people in the environment 200) and trigger the processor 102 to capture the stead state response profile at an appropriate time. The processor 102 may be configured to automatically switch to the normal operation mode after a predetermined amount of time following the user input.

In other examples, the processor 102 may be configured to perform a calibration step upon first installation of the radar device 100 in which it operates in the calibration mode, and then in the normal operation mode thereafter.

If the processor 102 determines that the environment 200 is currently in a steady state, it proceeds to measure the steady state response profile 300 of the environment 200, at S602 using the radar front end in the manner described above.

Once the processor 102 has determined the steady state response profile 300 of the environment 200, it stores the steady state response profile 300 to memory 104, at S603.

If, instead, the processor 102 at S601 determines that the environment 102 is not in a steady state, it proceeds to measure a test response profile 500 of the environment 200, at S604 using the radar front end in the manner described above.

Once the processor 102 has determined the test response profile 500 of the environment 200, it compares the test response profile 500 with the steady state response profile 300 stored in memory 104. The processor 102 is configured to make a determination as to whether there is a low-RCS object 250 located within the environment 200 based on the comparison of the test response profile 500 and the steady state response profile 300.

There are various schemes which could be employed by the processor 102 to determine presence of a low-RCS object 250, but they all work based on the assumption that the presence of a low-RCS object 250 in the environment 200 which was not in the environment 200 during capture of the steady state response profile 300 will result in at least a partial or complete loss of one or more response signals 301.

If there is no low-RCS object 250 located in the environment, it is expected that the test response 300 will be equal or roughly equal to the steady state response 300. Hence, in an example the processor 102 may determine a difference between the steady state response 300 and the test response 500. This may be performed at each of the response samples. The processor 102 may then apply a magnitude threshold to the difference in order to determine whether or not there is a low-RCS object 250 located in the environment 200. In other words, the processor 102 may determine presence of a low-RCS object 250 if the difference is above a threshold amount.

Note that each radar signal 201a-c may reflect multiple times within the environment 200 before being detected by the receive antenna 112, for example due to two large parallel surfaces within the environment 200. In cases where two (or more) reflections are seen, concealment of either reflection signal can be used by the processor 102 as an indication of presence within the environment 200. This is because the low-RCS object 250 may block just one of these reflections or may block two or more of these reflections. That is, some obstructions cause both to disappear (making it look like the target is in two places at one), some just the second reflection to disappear which would result in a correct detection event. Note also that for the reflection to be large (and hence provide opportunity for more reflections), the angle of incidence needs to be close to perpendicular. This means that the energy is sent straight back to the radar device 100. In reality, second reflections may be from, e.g., a parallel wall behind the radar device 100. In any case, the partial or complete absence of one (or more) reflected signals is indicative of the presence of a low-RCS object 250.

The processor 102 may be configured to compare the test response profile with the steady state response profile by determining a difference between the two (i.e. by subtracting the steady state response profile from the test response profile, or vice-versa). Calculating such a difference (e.g. a subtraction or ratio) between the test response profile and the steady state response profile also allows the processor 102 to determine increases or at least partial appearances of reflected signals. In general, the processor may determine the difference between the test response profile and the steady state response profile using any computation which identifies a degree of reduction in test energy in a range sample which can be used to make a decision (to identify at least partial absence of one or more reflected signals).

As mentioned above, the radar signal may reflect and/or refract multiple times within the environment 200 in a potentially very complex fashion. This may be a particularly strong effect at lower frequencies. Hence, presence of a low-RCS object 250 may result in such an increase or appearance of a reflected signal in addition to the at least partial absence of another.

Hence, the processor 102 may be configured to determine presence of a low-RCS object 250 in further dependence on identifying increase in signal strength of or at least partial appearance of a reflected signal. In other words, the processor 102 may determine a loss at specific points which use to be loud, while also identifying increased signal strength at other points. These increases can be used to increase the certainty on presence detection primarily provided by the losses.

In other examples, the processor 102 may be configured to compare the test response profile with the steady state response profile by determining a mean square difference between the two. The mean square difference may be calculated across all range bins. The mean square error is a measure of disturbance, both reflected and concealed.

If the processor 102 determines that there is a low-RCS object 250 present in the environment 200, it proceeds to generate an output indicating presence, at S606. The processor 102 may transmit the generated output via the output 103, e.g. to an external electronic device.

In some examples, if the processor 102 determines that there is not a target low-RCS object 250 present in the environment 200, it may still generate an output indicating that there is not a target low-RCS object 250 present.

Figure 7:
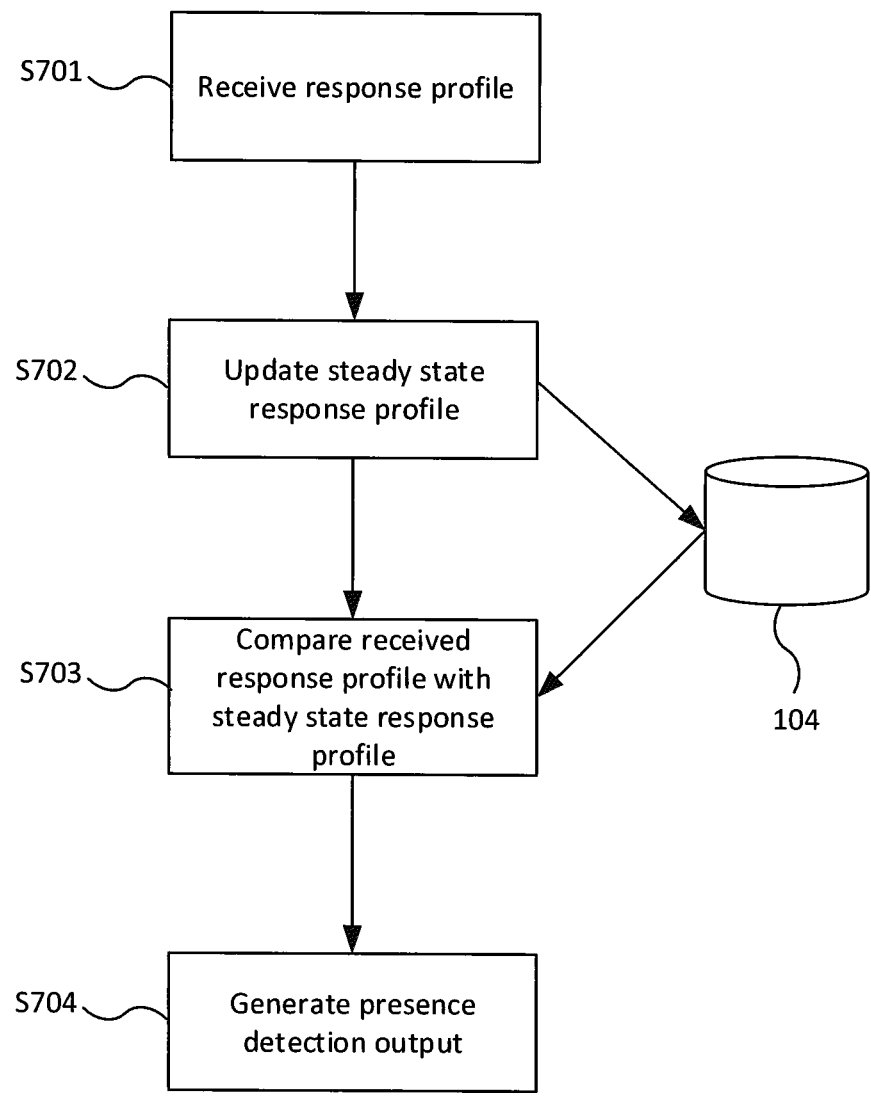
FIG. 7 is a flow diagram illustrating another example method performed by the processor of the radar device.

FIG. 7 is a flow diagram illustrating another example method performed by the processor 102. In this example, it is not necessary for the processor 102 to determine whether or not the environment 200 is currently in a steady state. Instead, it is assumed that a long-term average of response measurements will be representative of the steady state. In other words, the assumption is that a very long term averaging process may "smooth out" short-term changes in the response profile, meaning that the long-term average steady state response profile will be dominated by reflections from objects which never move (e.g. the walls), or rarely move (e.g. larger clutter items such as furniture are likely to be the least "mobile").

At S701, the processor 102 receives a response profile of the environment 200 from the radar front end.

At S702, the processor 102 updates the steady state response profile 300 stored in memory 104 to take into account the most recently-received response profile. The processor 102 may perform this step every time it receives a new response profile 300 from the radar front end. That is, the processor 102 may be configured to continually update the steady state response 300 stored in memory 104. The average taken to determine the steady state response 300 may be a running average over all previous response measurements, or may be a fixed N-point average of sufficient length (e.g. a 1,000-point average, 10,000-point average, etc.). In other words, the steady state response profile may be determined as an average of the last N response profiles measured. Alternatively, the long-term average may be applied over a given time window. That is, the steady state response profile may be determined as an average of all response profiles measured within a time window, such as the previous M hours. M may be, for example, 10 hours, 100 hours, etc.

At S703, the processor 102 compares the received response profile 500 with the steady state (average) response profile 300 stored in memory 104. This may be performed in any of the manners described above in relation to FIG. 6 and so not repeated here.

At S704, the processor 102 generates an output indicative of whether (or not) it has determined the presence of a low-RCS object. Again, this is performed in any of the manners described above in relation to FIG. 6 and so not repeated here.

In other examples, the processor 102 can perform a combination of the methods described above to determine the steady state response profile 300. That is, the steady state response profile may be determined as an average of a plurality of response profiles of the environment determined at different times, wherein each of the different times falls within a time period during which the environment is less likely to contain an object of low RCS.

For example, the processor 102 may determine the steady state response profile 300 as an average of multiple response profile readings captured by the radar front end, but may restrict the readings taken into account in the average to being those which are likely (or more likely) to be true steady states (i.e. when the environment 200 does indeed contain no target reflective objects 250). In these examples, the processor 102 may again take an N-point average, but this average need only be e.g. a 50-point average a 100-point average etc. because the measured response profiles have been determined to be (more likely to be) steady state response profiles. In a specific example in which the environment is an office space, the processor 102 may determine a plurality of response profile readings throughout the day and determine the steady state response profile 300 as an average of the readings taken only outside of working hours.

In other examples, the processor 102 may be configured to receive input from a sensor within the environment 200 indicative of whether there is a human currently present within the environment 200. An example of such a sensor is an infrared motion detector. The processor 102 may then determine the steady state response profile 300 when the input from the sensor indicates that there are no humans present within the environment 200. Note that the sensor may provide a very coarse indication such as a simple YES/NO flag regarding presence. This is sufficient for the processor 102 to decide when it is appropriate to measure the steady state response 300, but does not provide any detailed information. The presence detection employed by the processor 102 of the radar device 100 on the other hand can allow for more detail (e.g. location estimates, velocity estimates, etc.) as described in more detail below.

Figure 8:
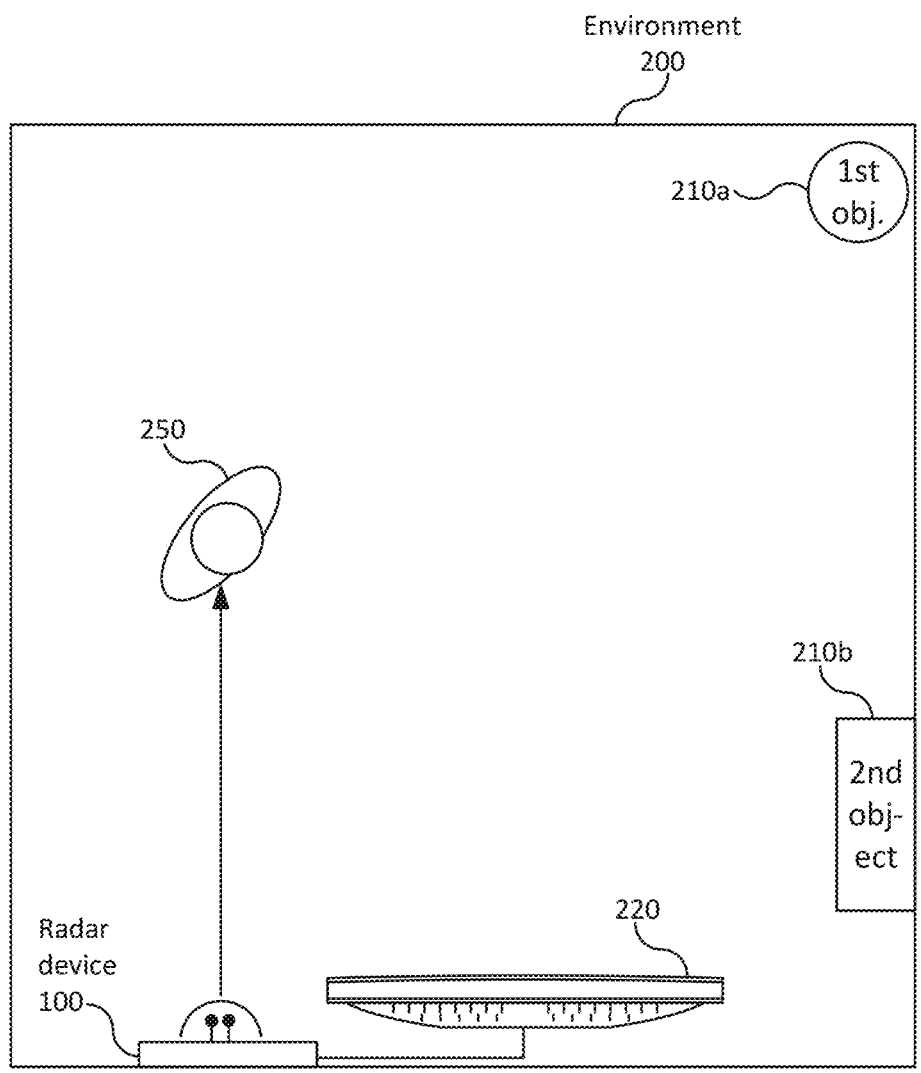
FIG. 8 shows schematically an example environment comprising an electronic device.

FIG. 8 shows schematically an example environment 200. In this example, the environment additionally comprises an electronic device 220. Examples of electronic devices include user devices such as, e.g. smartphones, laptops, etc., and consumer electronics devices such as televisions, set top boxes, smart speakers, etc. The radar device 100 is operatively coupled to the electronic device 220. In some examples, the radar device 100 may be integrated into the housing the electronic device 220 itself.

The radar device 100 functions as a presence detector within the environment 200. The output generated by the radar device 100 indicating presence (or potentially non-presence) within the environment 200 is sent to the electronic device 220. The electronic device 220 may use the received present indication to alter its behaviour.

In an example, the electronic device 220 may be configured to switch between a low-power and a high-power mode depending on the indicated presence value. In particular, the electronic device 220 may be configured to operate in a high-power mode when the radar device 100 indicates that a low-RCS object 250 is present in the environment 200, and the low-power mode at other times (when the radar device 100 does not indicate that a low-RCS object 250 is present in the environment 200). This is advantageous because, as mentioned above, the low-RCS object 250 is likely to be a human and therefore the electronic device 220 can save power by switching to a low-power mode when a human is not around to interact with it.

In a specific example, the electronic device 220 may be a smart speaker. In such a case, the high-power mode may be a "listening" mode in which the smart speaker is listening for voice commands from a human. When there are no humans in the vicinity of the smart speaker (within the environment 200), as determined based on the output of the radar device 100, the smart speaker can switch to a low-power (e.g. "OFF" or non-listening) mode and therefore save power without risking missing voice commands, because there is no human around to provide voice commands.

The above has described ways in which a determination regarding the presence or non-presence of a low-RCS object 250 with the environment 200 can be made. Below are described several extensions to these principles which allow more detailed information to be determined.

In one extension, the processor 102 can estimate the velocity of the low-RCS object 250 based on a duration of the absence or partial absence of a reflection (i.e. how long the low-RCS object 250 was blocking that RF signal) and an assumption regarding the lateral size of the low-RCS object 250.

The processor 102 may determine a duration of a concealment event, i.e. a time for which an identified absence or partial absence of a response signal 301 persisted. In some examples, the radar front end 101 may be configured to measure a response profile of the environment 200 at a sample frequency, e.g. the chirp rate of a FMCW radar. In such cases, the processor 102 may determine the duration of a concealment event by determining a number of samples for which the absence or partial absence of the response signal 301 is identified (e.g. if a concealment starts on chirp 1 and is over on chirp 5, the low-RCS object 250 has been in the way for 4 chirp durations). In either case, the processor 102 can determine a concealment time which is an indication of the time for which the low-RCS object 250 was concealing the respective output signal 201. The processor 102 may be configured to determine, based on the concealment time, an estimate of the velocity of the low-RCS object 250. This can be done by assuming a width of the low-RCS object 250. For example, by assuming the low-RCS object 250 is a human, a typical body width of a human being can be used. In these examples, the memory 104 may store information relating to the physical size of one or more low-RCS objects 250 which can be expected to be within the environment 200. An example of this the typical width of a human who lives or works in the environment 200. The memory 104 may alternatively or additionally store typical height information of the low-RCS object 250.

In another extension, described now with reference to FIGS. 4, 5 and 9 to 12, further multiple clutter concealment events can be used to estimate movement or velocity of the low-RCS object 250.

Consider the configuration of the environment 200 in FIG. 4 and the corresponding test response profile 500 described earlier. For the sake of explanation, assume that the low-RCS object 250 is a human or other mobile low-RCS object. The location of the human 250 within the environment 200 affects the test response 500 because this changes which radar signal are blocked.

In FIGS. 4 and 5, the human 250 is at a first location which blocks the first radar signal 201a. Hence, the first response 301a is missing from the test response 500.

Figure 9:
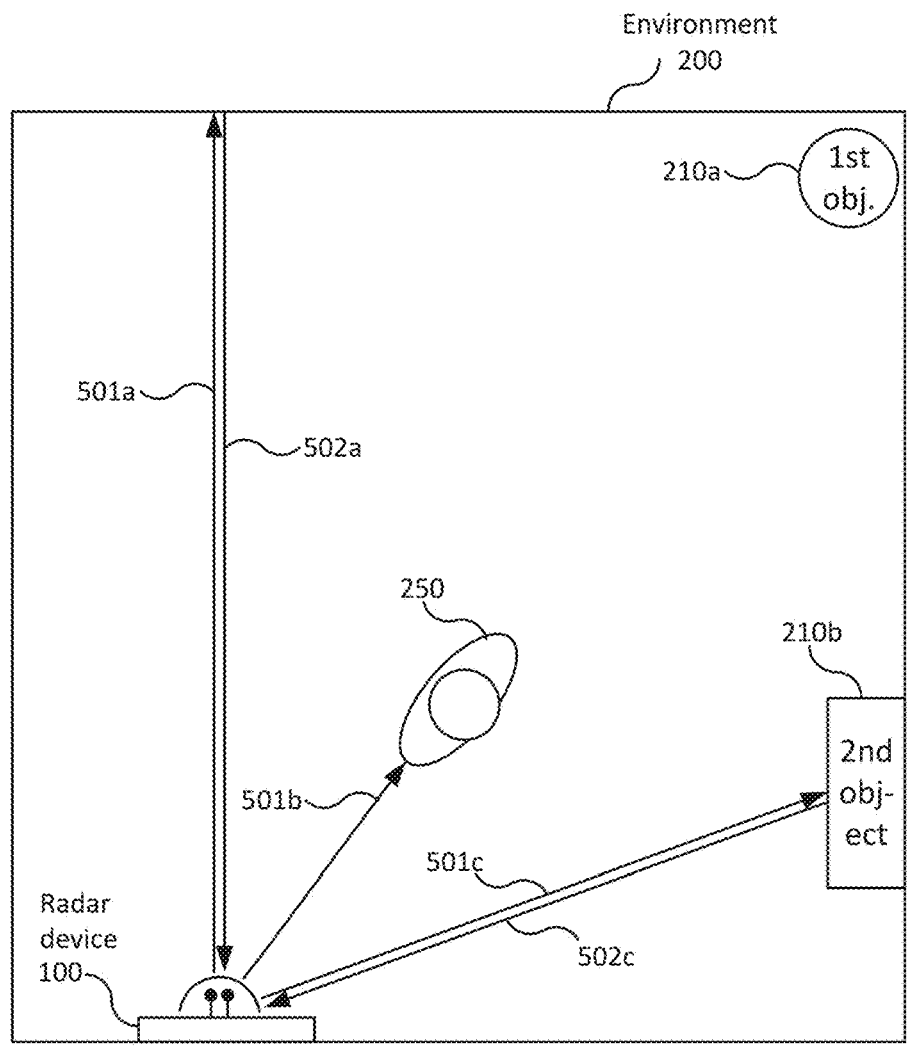
FIG. 9 shows schematically a top view of the environment in a third configuration.
Figure 10:
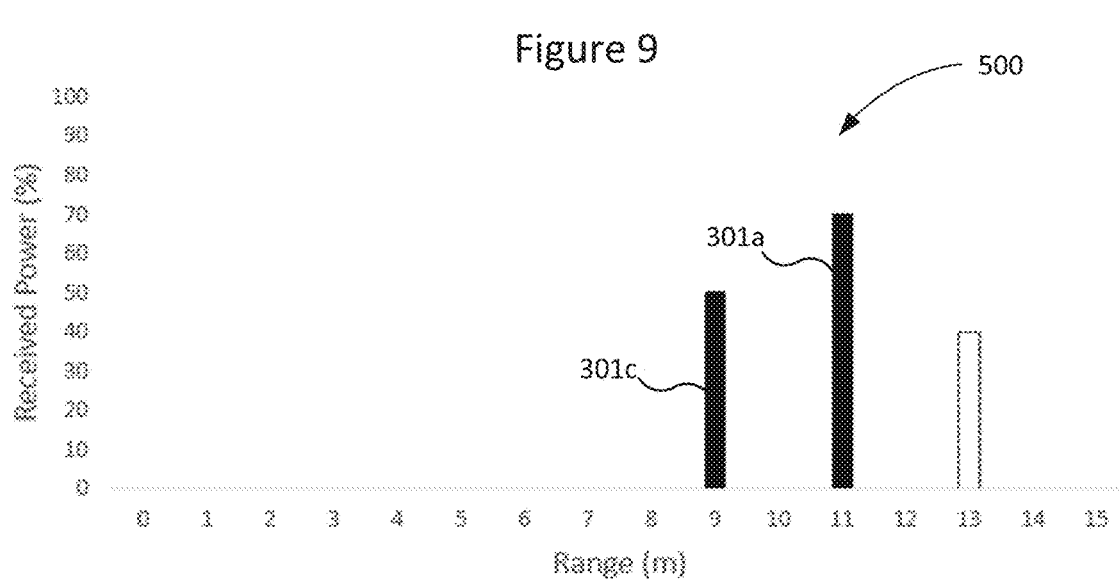
FIG. 10 illustrates a response profile of the environment in the third configuration shown in FIG. 9.

In FIGS. 9 and 10, the human 250 is at a second location which blocks the second radar signal 201b. Hence, the second response 301b is missing from the test response 500.

Figure 11:
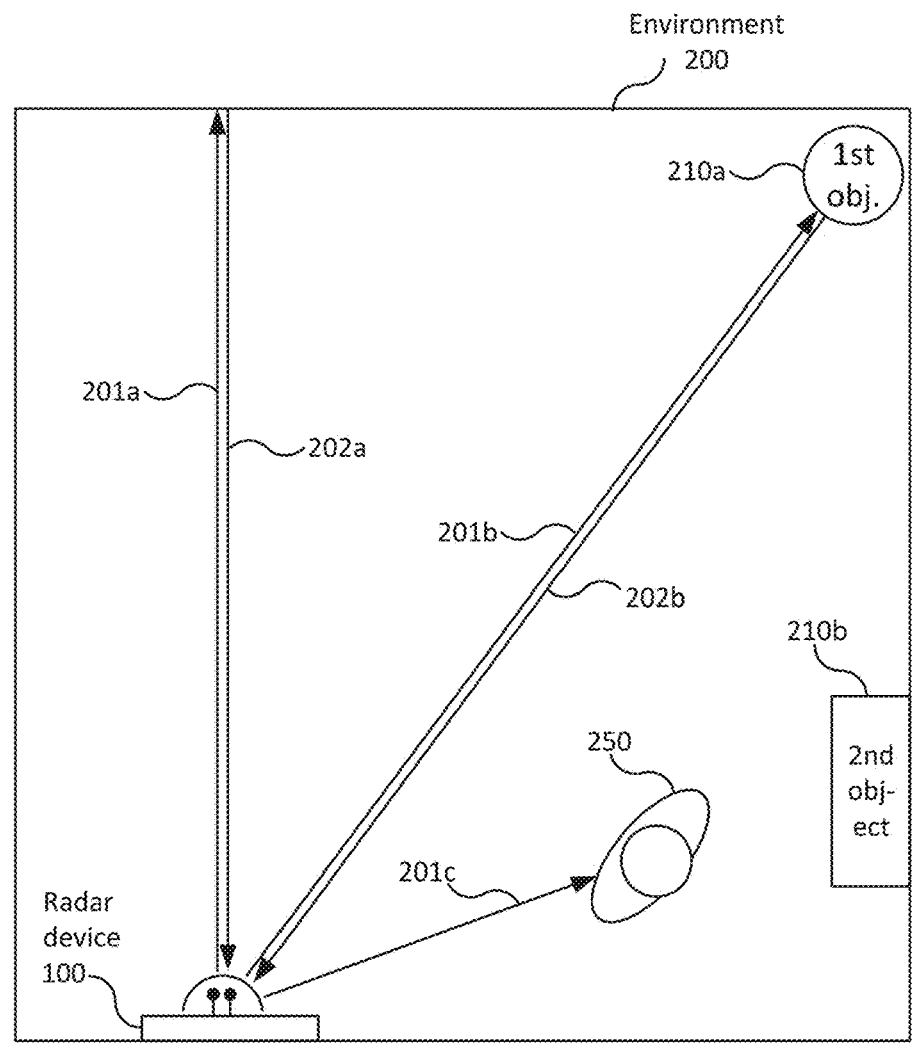
FIG. 11 shows schematically a top view of the environment in a fourth configuration.
Figure 12:
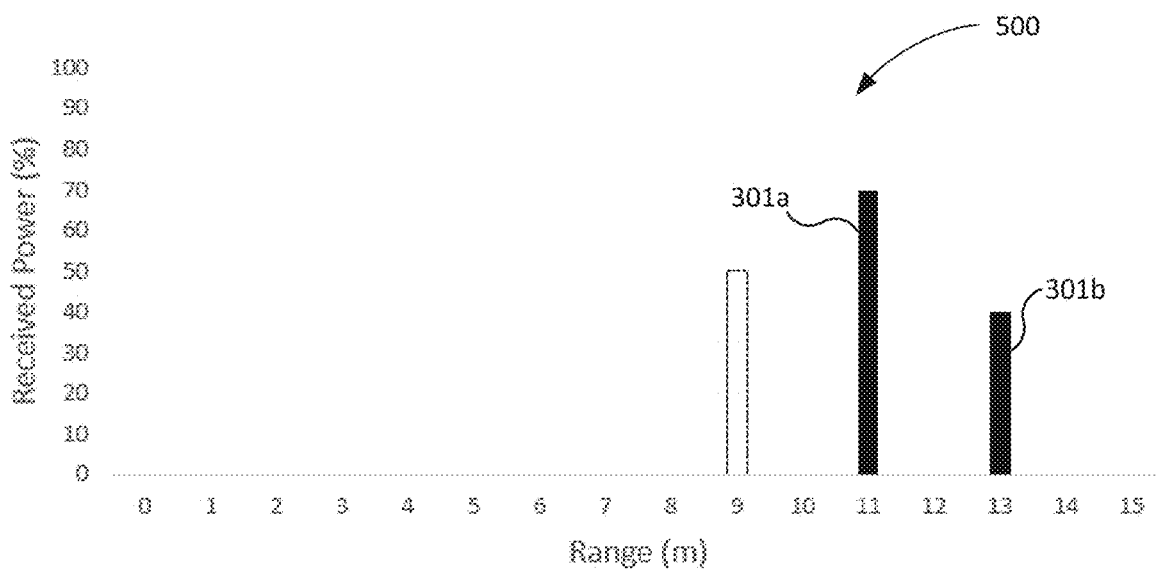
FIG. 12 illustrates a response profile of the environment in the fourth configuration shown in FIG. 11.

In FIGS. 11 and 12, the human 250 is at a third location which blocks the third radar signal 201c. Hence, the third response 301c is missing from the test response 500.

The processor 102 may be configured to take multiple readings of the test response 500 using the radar front end. The history of concealment events can allow the processor 102 to determine motion of the low-RCS object 250 (a human, in the example given above) within the environment 200. This may be done both from time between concealing one scattering centre to concealing another and the duration of each concealment event if the sample rate (e.g. chirp rate) is sufficient to allow reasonable measurement of duration.

The two extension techniques described above relating to estimating the velocity of the low-RCS object may be combined. That is, two estimates of the velocity can be determined using each of the techniques and then averaged to determine a final velocity estimate.

In other examples, the processor 102 may assume a typical velocity of the low-RCS object 250 (e.g. a typical human walking speed). From this, the processor 102 can estimate the horizontal dimension of the low-RCS object 250. This may be done using either the concealment duration or the time between concealment events, as described above. As described later, the processor 102 may be configured to classify the presence based on the determined horizontal dimension.

In another extension, the processor 102 may be configured to generate an output indicating presence within the environment 200 which is associated with a confidence value. There are several different factors which can affect the confidence value.

In a first example, the processor 102 may be configured to associate the generated output with a high confidence value as a function of the magnitude of the absence of the at least one reflected signal. However the processor 102 determines the difference between the test response profile and the steady state response profile (as a difference, ratio, etc.), the processor 102 may be configured to generate a confidence value based on the magnitude of the determined difference. For example, in the case where the processor 102 determines a mean square difference between the test response profile and the steady state response profile, the confidence value may be a function of the mean square difference.

In a second example, the processor 102 may be configured to associate the generated output with a higher confidence value in response to determining multiple concealment events.

In a third example, the processor 102 may be configured to associate the generated output with a higher confidence value in response to determining motion of the low-RCS object 250.

In another extension, it is noted only a single antenna 111 is required to perform the presence determination described herein. Therefore, this can provide effective means of protection against hardware failure. I.e. due to hardware failure, only a single receive chain of a multi-chain radar system may be operational. The present invention allows the radar system to continue to be useful despite the loss in functionality. This is the case for any radar front end having more than one receive chain.

In a specific extension, the radar front end may allow for additional parameters such as angle of arrival to be determined, as known in the art. Such a radar system typically employs a planar array of N antennas with N≥3. This can yield 3D position estimates of scattering centres (reflective objects 210) within the environment 200. Even if the radar front end comprises N=2 antennas, the angle of arrival in, e.g., azimuth can be determined. Such a radar front end would still provide the advantages with respect to redundancy mentioned above.

In another extension, if the radar front end is of a type with the ability to measure an angle of arrival (azimuth and/or elevation) as well as range, then a rough estimate of the location of the low-RCS object 250 can be determined. This is because each response in the steady state response profile is associated with a location relative to the radar device 100. When the processor 102 identifies that a low-RCS object 250 is located within the environment 200 based on one or more of these responses being blocked, it can also determine that the low-RCS object 250 is located somewhere along the line of sight from the radar device 100 to the location associated with the blocked response. The processor 102 may include an indication of this rough location estimate in its output.

The location information can be combined with the motion detection described above in relation to FIGS. 4, 5 and 9 to 12. In particular, the processor 102 may be configured to determine a series of locations of the low-RCS object 250. From this, the processor 102 can estimate a velocity of the low-RCS object 250 within the environment 200. The processor 102 may be configured to include an indication of the estimated velocity in its output.

In another extension, the location information can also be used to gauge height/size of the low-RCS object 250. That is, if the output from the radar front end is a set of locations {x,y,z} of reflective objects 210 within the environment 200, then the processor can determine a line of sight (a ray) along which the low-RCS object 250 must lie. This can therefore put bounds on the location of the low-RCS object 250. For example, if the height of the radar device 100 within the environment is known (or assumed or measured by the radar device 100 itself, e.g. if the radar device 100 has an unobstructed "view" of the floor), the vector from radar device 100 to the (blocked) reflective object 210 gives a bound on the height of the low-RCS object 250. As described later, the processor 102 may be configured to classify the presence based on the determined height or size.

In another extension, if a plurality of expected (steady state) responses 310 are missing from the test response profile 500, then this can mean that the low-RCS object 250 is blocking multiple reflections. Hence, tighter bounds can be put on the location and/or height of the low-RCS object 250. For example, multiple blocked responses at different ranges but the same azimuth could be used by the processor 102 to determine that the low-RCS object is likely to be a human, because human targets typically have much greater height than width. The processor 102 may include an indication of the type of low-RCS object 250 in its output.

If, instead, the azimuth angle of two blocked responses is greater than a threshold angle, the processor 102 may determine that multiple no-reflective objects 250 are present within the environment 200. The processor 102 may include an indication of the number of low-RCS objects 250 in its output. The threshold angle may depend on the distance (range) to the low-RCS object 250 (e.g. the range of the reflected signals which have been identified as at least partially absent).

In another extension, the information harvested relating to the likely size, height, and/or number of low-RCS targets 250 can be used by the processor 102 to determine a category of the low-RCS object(s) 250. For example, the processor 102 may distinguish between the following categories:

Pet: single reflective object, smaller than 0.5 m;
Child: Single low-RCS object, taller than 0.5 m and smaller than 1.5 m;
Adult: Single reflective object, taller than 1.5;
Family: Multiple low-RCS objects, some taller than others.

The processor 102 may be configured to classify the presence based on the determined horizontal dimension. For example, the processor 102 may compare the estimated horizontal dimension with expected horizontal dimensions associated with a category of low-RCS object 250 (these may be, e.g. stored in memory 104). Examples of expected horizontal dimensions include that of a typical adult, typical child, specific adult or specific child. By doing so, the processor 102 may identify the closest match in order to classify the presence. The processor 102 may then be configured to generate an output indicating not only that there is a presence within the environment 200, but the category of presence (e.g. an adult is present in the environment 200).

Similarly, the processor 102 may alternatively or additionally be configured to classify the presence based on the determined height or size. For example, the processor 102 may compare the estimated height or size with expected heights or sizes associated with a category of low-RCS object 250 (these may be, e.g. stored in memory 104). Examples of expected heights or sizes include that of a typical adult, typical child, specific adult or specific child. By doing so, the processor 102 may identify the closest match in order to classify the presence. The processor 102 may then be configured to generate an output indicating not only that there is a presence within the environment 200, but the category of presence (e.g. an adult is present in the environment 200).

In another extension, in cases where the radar front end comprises more than one antenna, there is a choice of processing antennas separately then combining answer or combining the responses from all available antenna to then test for disturbance. For example, some known radar antenna configurations allow for azimuth and elevation information to be determined by comparing phase differences in reflected signal received by two or more antenna. The processor 102 may be configured to store azimuth and/or elevation information in memory 104 in association with a respected reflected signal 301. The processor 102 may then be configured to estimate an azimuth and/or elevation of the low-RCS object 250 based on the stored azimuth and/or elevation of the response signal which is at least partially absent in the test response profile 500.

In another extension, multiple devices 100 may be provided to each detect presence within the same environment 200. In such cases, each device 100 is operatively coupled to a controller which receives presence information from each of the devices 100.

As each device 100 allows for at least an estimate of the range of the low-RCS object 250, three devices 100 may be used to triangulate the position of the low-RCS object 250.

The above has been described with reference to positive detection of presence of one or more low-RCS objects 250 within the environment 200. However, in another extension, the processor 102 may be configured to identify departure of presence of the low-RCS object 250. For example, the processor 102 may measure a second test response profile at a later point in time than the first test response profile. If the second test response profile is substantially the same as the steady state response profile, the processor 102 can determine that the low-RCS object 250 has departed (is no longer present within the environment 200). The processor 102 may be configured to generate an output indicating departure of the low-RCS object 250.

Specifically, the processor 102 may determine, by comparing the second test response profile to the first test response profile, that the reflected signal which was at least partially absent in the first test response profile has returned, i.e. it is present (once again) in the second test response profile.

In some examples, the processor 102 may be configured to determine departure of presence in response to not identifying any concealment events within a predetermined time window (e.g. 10 minutes).

In another extension, the processor 102 may learn over time the entry/exit point(s) within the environment 200, e.g. the location or a door in a room. This can be achieved by identifying the location of the last concealment event measured before departure of presence is determined. Both these techniques are described above and so not repeated here. This may also be used to reduce the duration of the predetermined time window mentioned above with regards to identifying departure of presence. That is, the processor 102 may be configured to identify departure of presence quicker if the last-identified concealment event was at the entry/exit point, because the low-RCS object 250 can be assumed more likely to be departing the environment 200 from that location.

As mentioned above, the low-RCS object 250 is in reality likely to be at least partially reflective, depending on the particular frequency of signals used and typically at closer range. This means that ultimately the concealment techniques described above can be combined with other processing for more robust estimations etc. That is, the concealment identification techniques can be used in combination with detection of the actual reflected energy from low-RCS object 250 (the target).

The device 100 may be configured to implement known radar detection techniques within the environment 200 to detect the presence of objects which are sufficiently reflective at the radar frequency or sufficiently close. This does not prevent the device 100 from also implementing the concealment techniques described herein to also detect objects which are not sufficiently reflective at the radar frequency.

As mentioned earlier, the steady state response profile need not be static. In some examples, the steady state response profile comprises predictable dynamic behaviour. In other words, objects which move in a predictable manner can give rise to reflections and/or concealments which are detected in the response profile but which can be discounted by the processor 102 based on their predictability. Examples of such objects include rotating ceiling fans, curtains, etc.

Hence, in some examples, the steady state response profile stored in memory 104 by the processor 102 may be a dynamic steady state response profile, i.e. a steady state response profile with an indication of changes to the response profile over time, such as an indication of one or more time windows in which the respective reflected signal is expected to be seen. Alternatively or additionally, different steady state response profiles can be determined for different time periods. For example, the processor 102 may determine a "day time" steady state response and a "night time" steady state response.

As a specific example, the RCS of a window depends strongly on whether or not the curtains are drawn. If the curtains are open, the glass of the window is exposed which is highly reflective. If the curtains are closed, the glass is concealed and only the substantially non-reflected fabric of the curtain is exposed. The steady state response profile may indicate a reflected signal which is expected to be present only during daylight hours. Hence, the processor 102 may be configured to determine presence of a low-RCS object 250 in response to identifying at least partial absence of at least one of the reflected signals in the test response profile that is expected to be present.

For example, "day time" steady state response profile may comprise a reflected signal from the window (because the curtains are open during the day), whilst the "night time" steady state response profile may not comprise this reflected signal from the window (because the curtains are closed during the night). Therefore, the processor 102 may be configured to perform the comparison between the test response profile and one of the steady state response profiles, depending on e.g. the time of day. In this example, the processor 102 may determine presence based on the absence of the reflected signal only during the day time.

Alternatively or additionally, machine learning could be used to enable the processor 102 to learn that certain scattering centres (reflected signals) come and go but are not of interest (not people, animals, etc.). The processor 102 may be configured to mark such reflected signals as "unreliable".

In general, the extensions described above relate to additional values which may be determined or estimated by the processor 102. Any, some or all of these values may be provided to a machine learning inference block. The machine learning inference block may then be configured to learn from the provided values in order to perform estimation and improve over time.

FIG. 13 is a schematic diagram illustrating a specific implementation of the electronic device 100. In this example, the radar front end 101 implements FMCW radar. It is appreciated that other forms of radar may be used. It is also appreciated that the particular configuration shown in FIG. 13 is only an example and that other configuration variants for FMCW (e.g. zero IF) may be used.

A reflective object 210 is illustrated in FIG. 13. The reflective object 210 is at a range r from the radar front end 101 and moving with radial velocity v.

The radar front end 101 comprises a chirp generator 1001, an RF transmit amplifier 1002, and at least one antenna receive chain 1010. The antenna receive chain 1010 comprises at least an RF receive amplifier 1003, a mixer stage 1004, a base band amplifier 1005, a low-pass filter 1006, an analogue-to-digital converter, ADC, 1007, a fast Fourier transform, FFT, module 1008, and a range compensation module 1009. The antenna receive chain 1010 may also comprise other elements such as a high-pass filter used to reduce direct coupling from the transmit antenna 111 to the receive antenna 112. It is appreciated that there may be more than one antenna receive chain 1010, and that each antenna receive chain 1010 may be operatively coupled to a respective receive antenna 112.

In any case, the chirp generator 1001 is operatively coupled to the RF transmit amplifier 1002. The chirp generator 1001 is configured to generate a chirp signal and provide it to the RF transmit amplifier 1002. The RF transmit amplifier amplifies the chirp signal and provides it to the transmit antenna 111 for output in the manner described above. The chirp generator 1001 also provides the chirp signal to the mixer stage 1004. When there are multiple antenna receive chains 1010, the chirp generator 1001 is configured to provide the chirp signal to the mixer stage 1004 of each antenna receive chain 1010.

The RF signal output by the transmit antenna 111 is reflected off the reflective object 210 (this was described above). Reflected signal(s) are received by the receive antenna 112 and provided to the RF receive amplifier 1003. The RF receive amplifier 1003 amplifies the received reflected signal and provides it to the mixer stage 1004.

The mixer stage 1004 then compares the (amplified) reflected signal with the chirp received from the chirp generator 1001 and outputs the difference between the two to the base band amplifier 1005. The base band amplifier 1005 amplifies this difference and provides it to the low pass filter 1006. The low pass filter 1006 filters the signal and provides it to the ADC 1007. The ADC 1007 provides the converted digital signal to the FFT module 1008. The FFT module 1008 transforms the signal to the frequency domain and provides the transformed signal to the range compensation module 1009. The range compensation module 1009 is configured to compensate for known or expected path losses in the received echo signal. For example, to compensate for the diminishing signal strength with increasing range, by amplifying the signals as a function (e.g. $r^4$) of their range.

The output from the radar front end 101 is provided to the processor 102, as described above. This is also illustrated in FIG. 13. The operation of the processor 102 has been described above.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (including for example a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method comprising:
   A) using radar detection at one or more radar frequencies greater than or equal to 2 GHz to determine a steady state response profile of an environment, the steady state response profile comprising at least one indication of one or more reflected signals from a first object in the environment, the first object having a first radar cross section, RCS;
   B) storing the steady state response profile to a memory;
   C) using radar detection at the one or more radar frequencies to determine a test response profile of the environment;
   D) comparing the test response profile with the steady state response profile to determine a presence in the environment of an object of lower RCS than the first RCS, by identifying at least partial absence of at least one of the reflected signals in the test response profile; and
   E) estimating a velocity of the object of lower RCS based on a duration of the at least partial absence of the at least one of the reflected signals and an expected horizontal size of the object of lower RCS.

2. The method according to claim 1, wherein the steady state response profile is determined as an average of a plurality of response profiles of the environment determined at different times.

3. The method according to claim 1, wherein the steady state response profile is determined during one or more time periods during which the environment is less likely to contain an object of lower RCS than the first RCS than outside the one or more time periods.

4. The method according to claim 1, wherein the steady state response profile is determined in response to user input.

5. The method according to claim 1, wherein the steady state response profile is determined at least partially during an initial calibration step.

6. The method according to claim 1, wherein the radar detection is frequency-modulated continuous-wave, FMCW, radar detection.

7. The method according to claim 1, wherein said comparing comprises determining a difference between the test response profile and the steady state response profile, wherein presence of the object of lower RCS is determined in response to the difference being greater than a threshold value.

8. The method according to claim 1, wherein the one or more radar frequencies are greater than or equal to 10 GHz.

9. The method according to claim 1, wherein the environment is an indoor environment.

10. The method according to claim 1, comprising estimating a horizontal size of the object of lower RCS based on a duration of the at least partial absence of the at least one of the reflected signals and an expected velocity of the object of lower RCS.

11. The method according to claim 1, comprising repeating steps C and D to determine two at least partial absences of different respective reflected signals; and estimating a velocity of the object of lower RCS based on a time difference between when the two at least partial absences occurred.

12. The method according to claim 1, comprising repeating steps C and D to determine multiple instances of presence in the environment of an object of lower RCS than the first RCS, wherein the determined presence of an object of lower RCS than the first RCS is associated with a confidence value, the confidence value being based on the determined number of instances of presence.

13. The method according to claim 1, wherein the reflection is associated with a known location within the environment, and the method comprises estimating a location of the object of lower RCS based on the known location associated with the reflection which is identified to be at least partially absent in the test response profile.

14. The method according to claim 1, comprising controlling an electronic device based on the determined presence of the object of lower RCS.

15. The method according to claim 1, comprising controlling the electronic device to enter an increased-power mode in response to determining presence of the object of lower RCS.

16. An apparatus comprising:
   a radar front end for implementing radar detection at a radar frequency of 2 GHz or greater to determine radar response profiles of an environment;
   a memory storing a steady state response profile of the environment, the steady state response profile comprising an indication of one or more reflected signals caused by reflection of an emitted radio frequency signal from a first object in the environment, the first object having a first radar cross section, RCS;
   a processor configured to:
   use the radar front end to determine a test response profile;
   compare the test response profile with the steady response profile stored in the memory to identify at least partial absence of at least one of the reflected signals in the test response profile indicative of an object of lower RCS than the first RCS being present in the environment;

in response to determining presence of the object of lower RCS in the environment, generate an output indicating presence of the object of lower RCS in the environment; and estimate a velocity of the object of lower RCS based on a duration of the at least partial absence of the at least one of the reflected signals and an expected horizontal size of the object of lower RCS.

17. The apparatus according to claim 16, wherein the apparatus is integrated into a consumer appliance.

18. A system comprising the apparatus according to claim 16 installed in the environment.

19. The system according to claim 18 comprising at least one reflector disposed within the environment, the first object comprising the reflector.

* * * * *